(No Model.) 3 Sheets—Sheet 1.
J. G. MOOMY.
ART OF FORMING TIRES OR OTHER TUBES AND MOLDS FOR USE THEREIN.
No. 553,212. Patented Jan. 14, 1896.
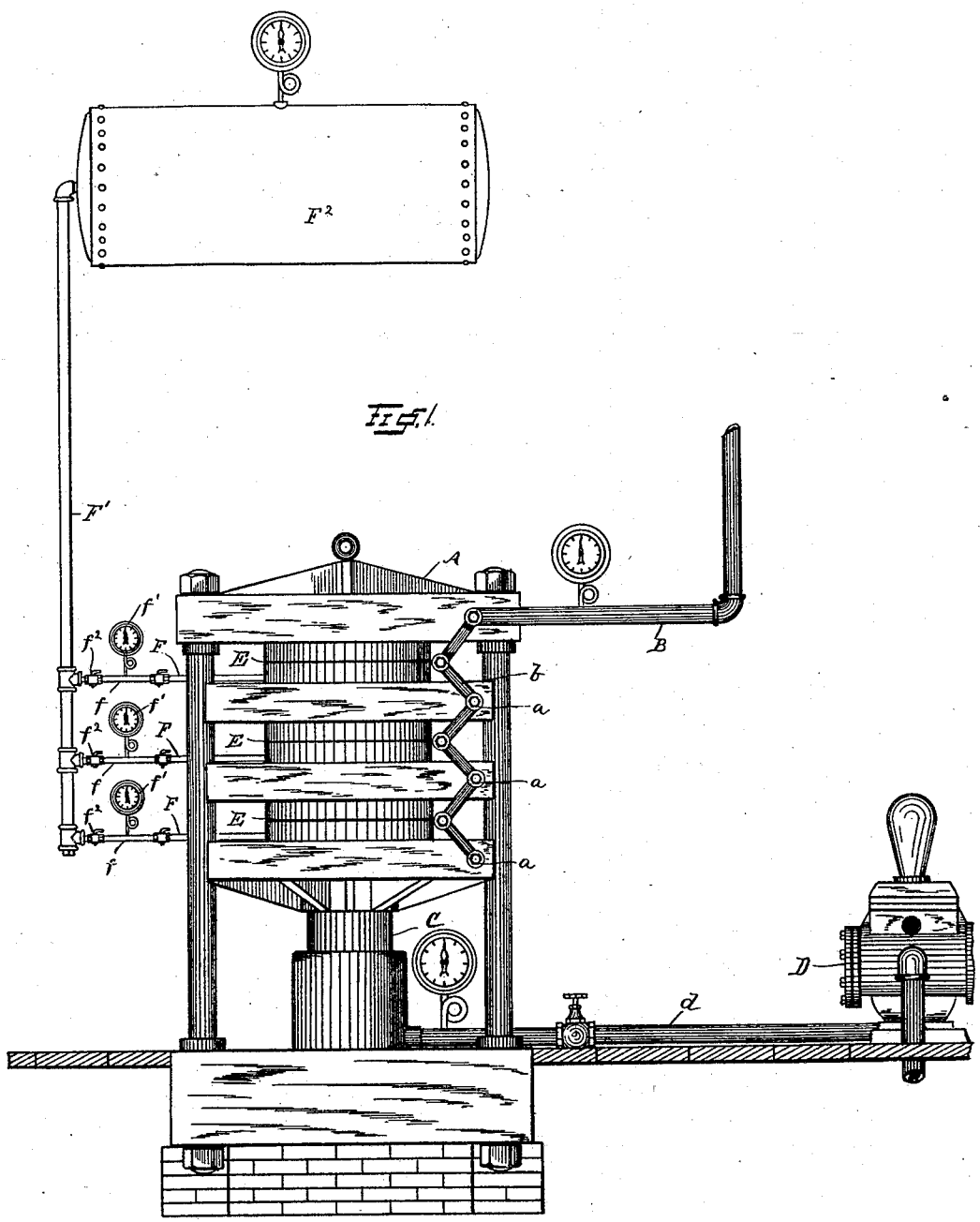
WITNESSES:
INVENTOR
ATTORNEYS

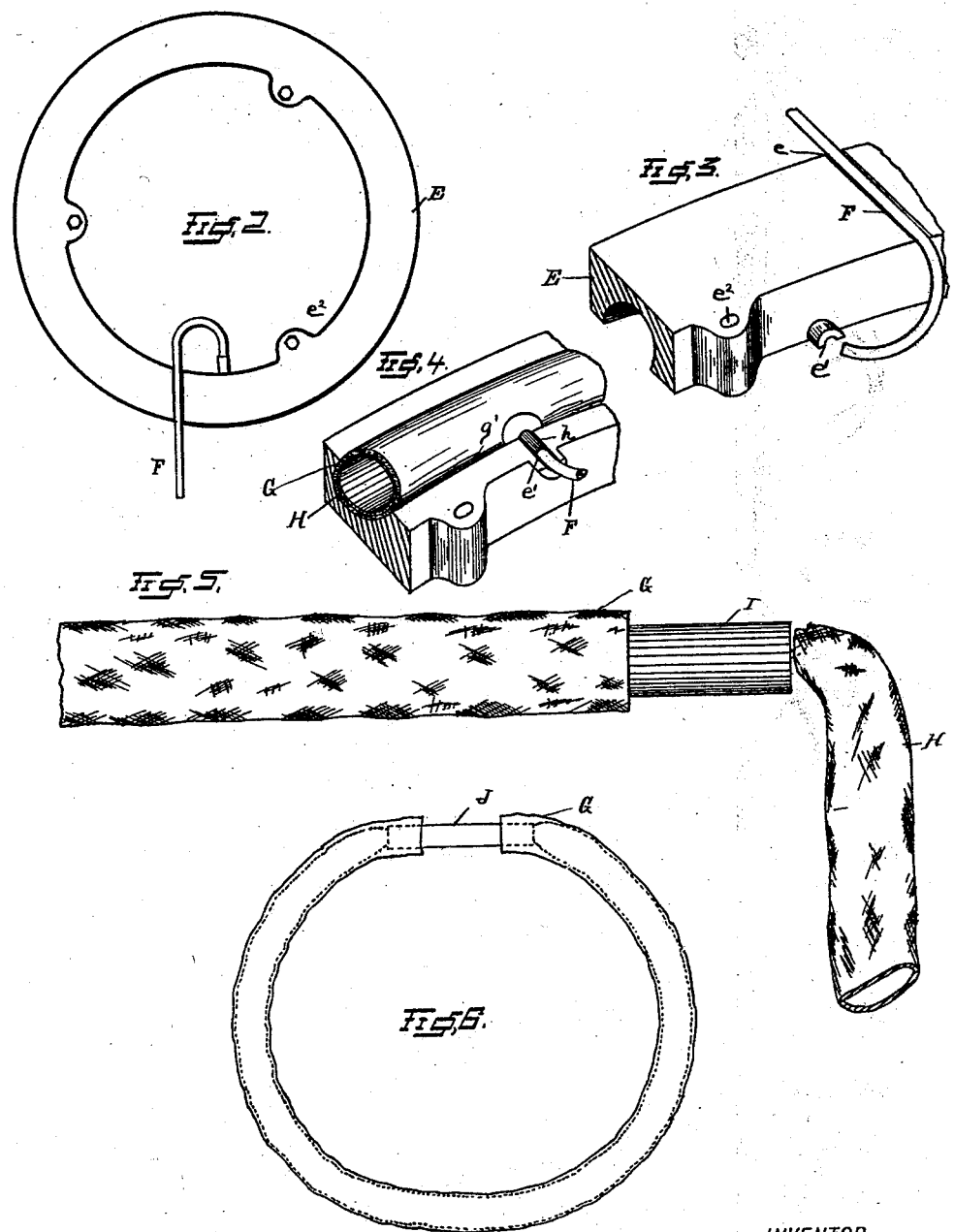

(No Model.) 3 Sheets—Sheet 3.
J. G. MOOMY.
ART OF FORMING TIRES OR OTHER TUBES AND MOLDS FOR USE THEREIN.
No. 553,212. Patented Jan. 14, 1896.
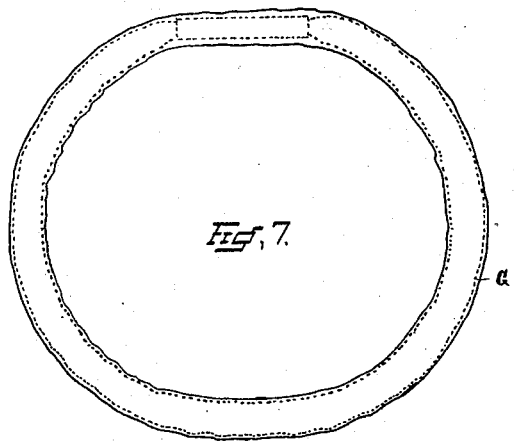
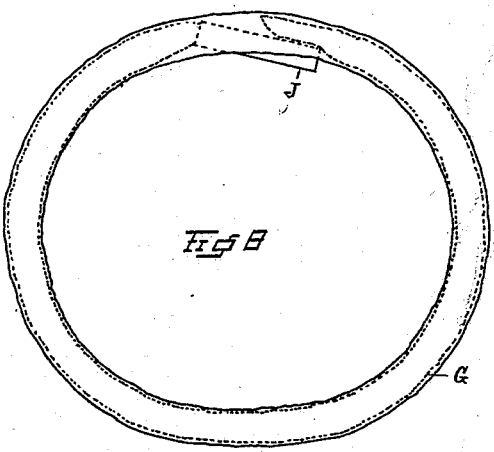
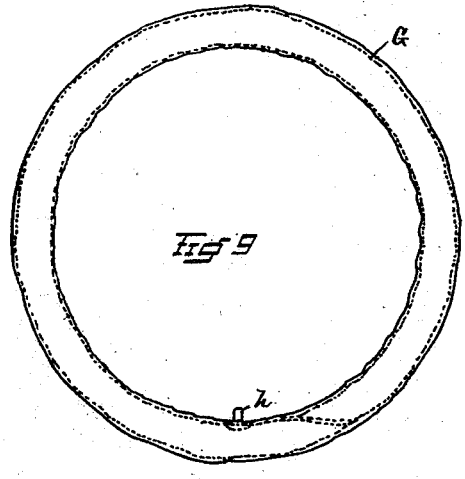
WITNESSES:
INVENTOR
ATTORNEYS

UNITED STATES PATENT OFFICE.

JOSEPH G. MOOMY, OF ERIE, PENNSYLVANIA, ASSIGNOR TO MARY H. MOOMY, OF SAME PLACE, AND THE COMBINATION ROLL AND RUBBER COMPANY, OF BLOOMFIELD, NEW JERSEY.

ART OF FORMING TIRES OR OTHER TUBES AND MOLDS FOR USE THEREIN.

SPECIFICATION forming part of Letters Patent No. 553,212, dated January 14, 1896.

Application filed October 12, 1894. Serial No. 525,679. (No model.)

*To all whom it may concern:*

Be it known that I, JOSEPH G. MOOMY, a citizen of the United States, residing at Erie, in the county of Erie and State of Pennsylvania, have invented certain new and useful Improvements in the Art of Forming Tires and other Tubes and Molds for Use Therein; and I do hereby declare the following to be a full, clear, and exact description of the invention, such as will enable others skilled in the art to which it appertains to make and use the same.

This invention relates to an improvement in the art of molding tires or other tubes of rubber fabric and a mold for use in said art; and it consists in certain improvements therein, as will be hereinafter fully described, and pointed out in the claims.

The invention is illustrated in the accompanying drawings, as follows:

Figure 1 shows a mold-press with molds and parts incident thereto in place. Fig. 2 is a plan view of the mold. Fig. 3 shows a perspective view of a fragment of the upper half of the mold. Fig. 4 shows a like view of a fragment of the under half of the mold with a fragment of tire or tube in place therein. Fig. 5 shows a fragment of tire or tube in process of construction. Figs. 6, 7, 8 and 9 show a tire or tube in the different stages of construction.

A marks the press, which is adapted to receive three molds; $a$, the steam-plates; B, the steam-pipe; $b$, the pipes joining the several plates; C, the hydraulic cylinder; D, the pump for working the press; $d$, the pipe leading from the pump to the cylinder C, and E the molds in place in said press.

Heretofore, so far as I am informed, two leading methods have been employed in molding tires or tubes of this class. In one of these methods an inner core of metal or other suitable material is used for forming or molding the inner surface of the tube. There are several objections to this method, among which may be mentioned the tendency such a core has, by reason of its weight, of making the walls of the tube of uneven thickness, and where canvas forms part of the tube, as is usual in the tube used for tires, a perfect union of the canvas and rubber is not always formed. There is also some difficulty in removing the core.

By the second method a mold for the outer surface is provided and the walls of the tube forced against the mold by internal pressure exerted by gas or liquids under pressure. Gas under pressure has been obtained either by inflating the tube or putting into it something that expands greatly or forms gas under heat, such as ammonia. This last method overcomes many of the objections where the solid core is used. The great difficulty with this method is the liability of the tube leaking, especially when the rubber is in its softest condition, during vulcanization. Any such leakage so reduces the internal pressure as to allow the tube to collapse, and consequently the tube is improperly formed. There are other methods of forming tubes in which the objections above enumerated enter more or less. To remedy these defects is an object of my invention.

My invention as illustrated is adapted to forming tires, the adaptation forming part of my invention.

In forming the tire G, I first form it of the proper length upon a straight mandrel I, as shown in Fig. 5. A tube H, preferably of partially-vulcanized rubber, but so compounded as to vulcanize under the same heat, also in the same time, as tire G, having been first treated with soapstone or other non-adhesive material and attached to the end of the mandrel I, is drawn into the tire as the mandrel is withdrawn. The ends of the tube H are then respectively tucked into the ends of a short hollow mandrel J, as shown in Fig. 6, and the ends of the tire G joined together and formed upon the mandrel, as shown in Fig. 7. A slit $g'$ (shown in Fig. 4) is cut into the tire immediately under the mandrel J, and the mandrel removed, as shown in Fig. 8. The ends of the tube H, which are closed, are then lapped past each other, as shown by dotted lines in Fig. 9, and a rubber valve-tube $h$ on the tube H leads out through the slit in the tire. The slit is then temporarily closed in any suitable manner and the tire and tube placed in the mold, as shown in Fig. 4, the valve-tube being placed in a small duct $e'$, leading into the mold. A pipe F is inserted into the valve-tube $h$, and is carried out from the center of the mold by way of a groove $e$ in the top of the mold. The duct $e'$ and pipe F are so proportioned that when the parts of the mold are clamped together the walls of the duct clamp the tube $h$ to the pipe F, making an air-tight joint.

When the molds are put into the press, the pipe F is connected by branch pipes to a main air-pipe F', which preferably leads to an air-chamber F², into which air is forced and maintained under pressure. The tube is then inflated through the pipe F, and the process of vulcanization proceeds.

At some convenient point, preferably on the branch pipes $f$, are placed pressure-indicators $f'$. Suitable cocks $f^2$ are interposed between the branch pipes $f$ and the main pipe F.

From the foregoing it will be noted that during the process of vulcanization the tire is inflated and pressed against the walls of the mold by compressed air or gas, and that a continuous connection with the interior of the tire is maintained and the pressure in the mold manifested at all times in the pressure-gages. By this method all the advantages due to an elastic core of gas are secured. If during the time the rubber is "flowing" the tire should leak, sufficient air is passed into the mold through the pipe F to maintain an internal air-pressure, and consequently the danger of the tire being spoiled by collapsing is obviated. Usually, as the rubber hardens, these leaks will close themselves and the tire come out perfect, and should there be a small leak it can readily be remedied after the tire is removed from the mold. I have illustrated this feature of my invention with a double-tube tire; but I do not wish to be understood as confining myself to such adaptations.

What I claim as new is—

1. The improvement in the art of forming tires or endless tubes of rubber fabric, which consists in forming a tube with open ends, inserting therein a tube with closed ends, joining the ends of the outer tube, inflating said tubes with gas or liquid under pressure in the inner tube, and vulcanizing said tubes thus formed under pressure.

2. The improvement in the art of making tires, which consists in forming an endless outer tube, in which is inserted an inner tube with closed ends said ends lapping past each other, and vulcanizing said tire with a core of gas or liquid under pressure in said inner tube.

3. The combination of a mold having a valve tube duct $e'$ therein, of a pipe for entering the valve tube when in the mold, said duct being of such size relative to said pipe as to clamp the valve tube when in place to said pipe.

4. The combination with a mold for molding and vulcanizing tubes, wherein gas or liquid under pressure is used to act as a core for said mold, of means of supplying said gas or liquid under pressure to said mold from without said mold and during the process of vulcanization.

5. The combination with a mold for molding and vulcanizing tubes, wherein a core of gas or liquid under pressure is used to complete said mold; of means of connecting said core with gas or liquid under pressure from without said mold and during the process of vulcanization.

6. The combination with a mold for molding and vulcanizing tubes wherein gas or liquid under pressure is used to complete said mold, of means of supplying said gas or liquid under pressure to said mold from without said mold and during the process of vulcanization; and means of ascertaining the pressure of gas or liquid within said mold.

In testimony whereof I affix my signature in presence of two witnesses.

JOSEPH G. MOOMY.

Witnesses:
L. E. TORRY,
H. C. LORD.